United States Patent [19]
Frazer et al.

[11] Patent Number: 4,604,065
[45] Date of Patent: Aug. 5, 1986

[54] TEACHING OR AMUSEMENT APPARATUS

[75] Inventors: Stephen O. Frazer; Martin P. Riddiford, both of London, England

[73] Assignee: Price/Stern/Sloan Publishers, Inc., Los Angeles, Calif.

[21] Appl. No.: 697,973

[22] Filed: Jan. 23, 1985

Related U.S. Application Data

[63] Continuation of Ser. No. 478,680, Mar. 25, 1983.

[30] Foreign Application Priority Data

Oct. 25, 1982 [GB] United Kingdom ............... 8230363

[51] Int. Cl.⁴ .............................................. G09B 7/06
[52] U.S. Cl. .................................... 434/331; 434/338; 283/88; 283/93; 283/94; 235/468; 235/472; 273/153 R; 273/1 GA
[58] Field of Search ............... 434/331, 335, 338, 341; 382/59; 235/468, 472, 491; 283/88, 93, 94, DIG. 902

[56] References Cited

U.S. PATENT DOCUMENTS

| | | | |
|---|---|---|---|
| 3,473,027 | 10/1969 | Freeman et al. | 235/491 |
| 3,621,250 | 11/1971 | Wetzstein | 235/468 |
| 3,663,813 | 5/1972 | Shaw | 235/468 |
| 3,786,237 | 1/1974 | Postal | 235/468 |
| 3,911,270 | 10/1975 | Traub | 235/472 |
| 4,202,491 | 5/1980 | Suzuki | 235/468 |
| 4,310,180 | 1/1982 | Mowry, Jr. et al. | 283/93 |
| 4,337,375 | 6/1982 | Freeman | 235/472 |
| 4,351,547 | 9/1982 | Brooks, II | 283/93 |

*Primary Examiner*—Richard C. Pinkham
*Assistant Examiner*—Leo P. Picard
*Attorney, Agent, or Firm*—Abelman Frayne Rezac & Schwab

[57] ABSTRACT

Teaching or amusement apparatus consists of a substrate bearing printed intelligence and a detector pen or unit for use therewith. The detector pen discriminates between areas on the printed substrate by means not visible to the naked eye e.g. by a difference in magnetic properties, infrared reflective properties or capacitative properties of different parts of the printing. Depending on the type of printing and the degree of complexity of detection, a wide variety of games and teaching aids may be produced using this basic approach. A typical example is a quiz game where a question may be followed by five printed answers, only one of which is correct, that correct one being printed in a detectably different way from the others.

26 Claims, 12 Drawing Figures

TEACHING OR AMUSEMENT APPARATUS

This is a continuation of application Ser. No. 478,680 filed Mar. 25, 1983.

This invention relates to teaching or amusement apparatus, though the invention is not restricted to those areas of application.

Quiz game apparatus is known in which a set of questions and answers are printed on a card with holes in. The card is overlaid on a sheet having a conductive pattern (e.g. a printed circuit board) and the user has some sort of apparatus with which it can be determined, e.g. by a light lighting up, which answer goes with which question. Such apparatus, although attractive for children, is relatively inflexible in operation, particularly having regard to the fixed geometrical relationship (determined by one conductive pattern) between the question and the correct answer.

We have now found that by the use of certain printing techniques and a correct/incorrect answer detector much more flexible systems may be produced.

In accordance with the invention there is provided apparatus comprising a substrate bearing printed intelligence and having spatially separated areas having non-visually distinguishable properties (to the naked eye), having intellectually distinguishing criteria, and either being visually identical, or being visually differentiated by criteria not matching the intellectually distinguishing criteria, and a hand-held detector including a sensor head adapted to be placed against the printed intelligence and to differentiate the spatially separated areas from one another on the basis of their non-visually distinguishable properties, and to give a sense perceptible, preferably audible, indication thereof.

In a typical embodiment, the substrate is a sheet of paper, possibly forming part of a book or pamphlet and the printed intelligence is in the form of pictures and written words. Other substrates such as card or plastics may, however, be used. The substrate is usually flat, but need not be, for example, a map or landscape may be printed on a sheet of thermoplastics which is subsequently heat-formed to a bas-relief structure.

The printing may comprise a series of questions to test, for example, general knowledge, and juxtaposed to each such question a variety of printed answers, some wrong, one at least right. The printing of the answers varies, and the detector can distinguish between the right answer and the wrong ones. Each answer is effectively encoded in non-visually perceptible form to indicate whether it is correct or incorrect, so that when the detector is presented to the answer, a sense perceptible indication is given as to whether the answer is correct or not. The sense perceptible indication may be, for example, a light, a distinct tone or buzzer, or one of two distinguishable noises, e.g. a dull sound for a wrong answer and a bright sound for a correct one.

A significant advantage of the present invention is that printing on the substrate is generally very cheap, and it is minimally expensive to take the trouble to print the data appropriate to the detector with which it is to be used. Specialised inks such as magnetic or metallic inks may be used with suitable detectors, e.g. using a capacitance or magnetic reluctance change as a scanning head is moved over the paper. However, a particularly convenient and cheap way of providing the lack of visual differentiation while establishing easy detection is by printing on a substrate of paper using four-colour lithographic process printing, and using the amount of black ink deposited as the variable on which the detector operates. The eye cannot distinguish between prints where part of the blackness arises from the printing of yellow+cyan+magenta and those where part of the blackness results from printing with carbon black ink. Since conventional yellow cyan and magenta inks are infrared-transparent and the carbon black in litho black inks is highly infrared absorptive, easy discrimination between prints on infrared reflective paper by an infrared reflectance/absorption detector is possible.

Discrimination is also possible between other media apparently identical to the eye. For illustrations of this, reference may be made to "Applications of AEG:-TELEFUNKEN's CNY 70 and K170P reflective opto couplers", Semiconductor Information 7.81, Friedhelm Eckholdt, published by AEG-TELEFUNKEN, note particularly section 2.2.2 "Reflection from different media".

Thus, in this aspect of the present invention, the detector may be an infrared "pen" comprising, e.g. an elongate tubular housing, an infrared transmissive tip at one end of the housing, an infrared emitter within the housing arranged to emit infrared radiation from the tip of the housing, an infrared detector within the housing arranged to be responsive to the intensity of the infrared radiation emitted from the pen which is reflected back into the tip by a reflecting surface to which the tip of the pen is presented, circuit means to provide to a user of the pen a first indication if the detected intensity of infrared radiation is below a predetermined threshold and a second indication if the intensity exceeds the threshold, and a suitable power supply, e.g. a battery. The pen may itself include all of these units, or may consist e.g. of two parts, a "pen" portion and a separate "control box" connected thereto by a wire, e.g. a flexible spiral lead.

Such a pen may be used in connection with a printed substrate by bringing the tip into contact with the relevant portion of the substrate. Preferably, the action of bringing the tip into contact with a substrate acts to switch on the circuit means, e.g. by arranging that the tip is movable and normally biassed to a position in which the circuit is switched off, and that on pressing the pen against the substrate, a suitable switch is operated. The whole pen tip may move relative to the body of the pen or, for example, the tip may incorporate an actuating pin mechanically connected to a switch.

The pen may be used simply as a detector by bringing it into contact with a test area of substrate and determining the result, e.g. by listening to an audible output. Alternatively, continuous detection across a plurality of areas on a substrate can be achieved by bringing the tip into contact with the substrate and then sliding it across its surface the indication emitted by the pen then changing as the pen is slid across the surface if the properties of the surface change sufficiently.

Thus, in the case of a simple printed quiz game, the pen may be brought into contact with one of a plurality of correct and incorrect answers printed on paper, or into contact with a colour patch printed over, under or next to each answer. It is very easy to print all the colour patches so that they are visually varied or identical but so that some only are differently reflective to infrared radiation, and so that any variation, e.g. in colour, does not correlate with e.g. intellectual "correctness" of the answer. Thus, the patches may be printed so that only that corresponding to the correct answer is rather less highly reflective to infrared radiation so that the intensity of radiation detected by the pen does not exceed the predetermined threshold and produces the second indication, typically a specific tone or buzz, or illumination of a light. Alternatively, one can work the other way round.

Such an infrared pen may, however be used by sliding it across a printed substrate in other types of game, e.g. it can be used in tracing games for following a printed path. If the infrared pen is not kept accurately on the path, an error indication may be provided as soon as the pen detects a change in the level of reflected infrared radiation, e.g. when the pen touches a printed area not on the path. The circuitry may include latching means causing the error indication to be maintained, so that, for example, the pen has then to be lifted off the substrate and replaced (e.g. at the beginning of a maze) by the user, who can then have another attempt. Such path-tracing apparatus can be useful in teaching hand and eye coordination, either to children learning it for the first time or as part of rehabilitation after accident or injury, or disease.

In an alternative, path games of this type may be used to teach spelling: A square grid may be filled with an array of letters and a picture of, for example, an elephant printed to one side of it. From a "start" position at one side of the grid, a path detectable with the pen, but not discernible to the eye of an illiterate, will pass through the letters E-L-E-P-H-A-N-T. Choice of an incorrect "next letter" will cause an error indication to be given.

In a particularly preferred embodiment, such a detector pen can discriminate between three ranges of infrared reflectance, so allowing 'path' and 'off path' areas to be indicated, and additionally allowing a "victory" or "success" signal to be emitted e.g. at the completion of a maze path, or a spelling path as described above.

The "pen" can be constructed in a normal pen shape as indicated above, or it can be disguised in some other form, e.g. a model car or animal having an emitter/detector device mounted on its underside.

The invention is illustrated, by way of example, with reference to the accompanying drawings in which.

Figure 1:
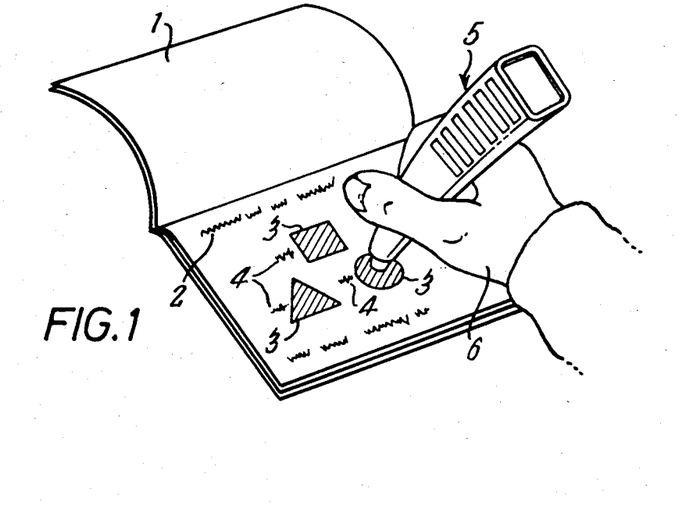
FIG. 1 shows an apparatus according to the invention and consisting of a detector and a printed substrate, the apparatus being shown in use.

Referring to the drawings, FIG. 1 shows a quiz book 1 having printed questions 2 on its pages. In this example a number of possible answers 4 are then given and next to each is a printed patch 3. The patches are printed on to the paper by the usual printing techniques and at the same time as the question. However, the printed patches have different responses to infrared radiation, although visually they can appear identical, or can be e.g. different colours but not with one colour correlating with "correct".

The quiz book 1 is used in conjunction with a detector pen 5 which can discriminate the different responses to infrared radiation. The user whose hand is denoted 6 places the tip of the pen on the patch adjacent what he thinks is the correct answer and the pen then gives an indication, preferably audible, of whether he has made the correct choice. Preferably the tip of the pen is spring-loaded or carries a spring-loaded contact so that only when the tip of the pen is pressed against the paper is the internal circuitry activated. This is explained in more detail below with reference to FIGS. 2 and 5. Of course, more than three choices may be possible, and some questions may have more than one right answer printed. The book may also be printed with path-tracking puzzles of hidden maze or spelling maze type as described above, or path-tracking games of skill in which the object of the excercise is to track the pen accurately around a sinuous track. The track is of different infrared response to the surrounding areas and accordingly using a detector pen of the type described in more detail below a user can determine whether or not he is on the track or not. This can provide amusement and teach hand and eye coordination. A hidden maze puzzle can consist of a tesselation of multi-coloured areas with a path through it defined by a different infrared reflectance. This path is not visible to the naked eye and can only be found with the pen. Since there is no eye visible indication of where the path was, trying to trace the path using the pen trains the memory. For such hidden maze games it is preferred to provide that the circuitry inside the pen latches the emitted signal if the user makes a false move until the pen is removed from the paper and a short period of time, e.g. one second, elapses. The hand movements necessary for writing may be taught by printing letters of the alphabet which can then be traced round to a continuous successful tone, which changes if the tracing is inaccurate.

The most convenient way of producing the printed substrate is by normal printing. Particularly for childrens books, colour printing is desirable and in the present invention four-colour lithographic process printing is the process of choice. This printing process enables in particular dark colours to be printed in one of two ways: either they are printed using a combination of cyan, yellow and magenta inks and no or substantially no carbon black ink, or they may be printed using less of the coloured ink and more of the carbon black. By careful control, it is possible to produce prints which look the same colour to the naked eye, but look very different at infrared wavelengths, i.e. the distinguishing criterion of infrared absorption is disguised by the presence of additionally indistinguishable (at non IR wavelengths) markings. The reason for this is that the human eye has a typical visible light response in the range of about 380 to 750 nanometers, a peak response being at 500 to 600 nanometers. Semi-conductor infrared emitters and detectors have a peak spectral sensitivity generally in the region of 800 to 1,000 nanometers, and at these wavelengths black lithographic ink is absorptive.

Typical four-colour inks, conforming to European Standard 4666, are process red (magenta), process blue (cyan), yellow and black. The black is typically a carbon black with added prussian blue. We have found that the change in reflected IR-radiation between 0% and 20% carbon black gives sufficient detector current change but allows bright similar looking colours to be retained. For example the following colours look similar to the naked eye but different to the IR photo-detector:

| | | | | |
|---|---|---|---|---|
| Dark red: | carbon black | 20% | carbon black | 0% |
| | blue | 0% | blue | 20% |
| | magenta | 100% | magenta | 100% |
| | yellow | 40% | yellow | 40% |
| Fir Green: | carbon black | 20% | carbon black | 0% |
| | blue | 100% | blue | 100% |
| | yellow | 40% | yellow | 40% |
| | magenta | 0% | magenta | 20% |

In the printing art, the term percentage is used to denote the total area occupied by a screen of printed dots per unit area of substrate, and is not be be confused with the percentage of color concentration of the ink itself, the color concentration in the ink being in accordance with industry standards. Thus, a printing of 20% carbon black ink will be a printing of a standard ink including carbon black and a suitable vehicle in standard proportions, the printing having been effected in a screen of dots occupying only 20% per unit area of the substrate. Similarly, printings in blue, red and yellow or variations thereof, will be printings of inks of standard color concentration and of standard hue and intensity, in screens of dots occupying the stated percentage of unit area of the substrate, including and up to 100%, in which event the dots of the screen will occupy the total unit area of the substrate.

Figure 2:
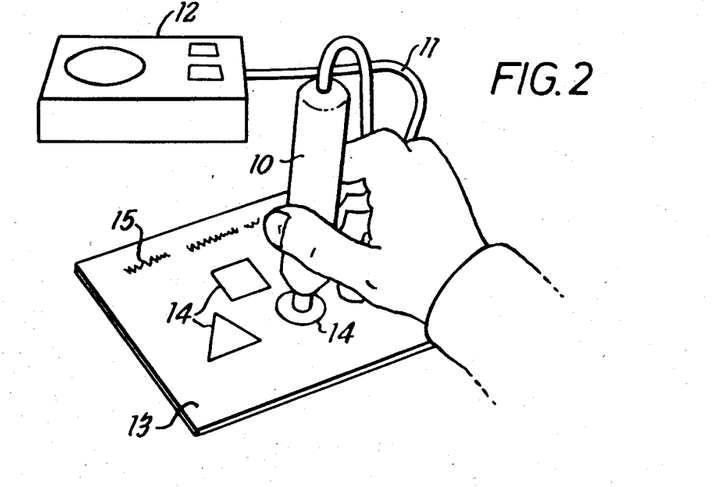
FIG. 2 shows an alternative apparatus in use.

FIG. 2 shows apparatus similar to that in FIG. 1 but with a separate detector head 10 connected by a wire 11 to a box 12 containing the circuitry, which may be mains or battery powered. The detector head is used in conjunction with a work card 13 on which are printed patches 14 and text 15.

Figure 3:
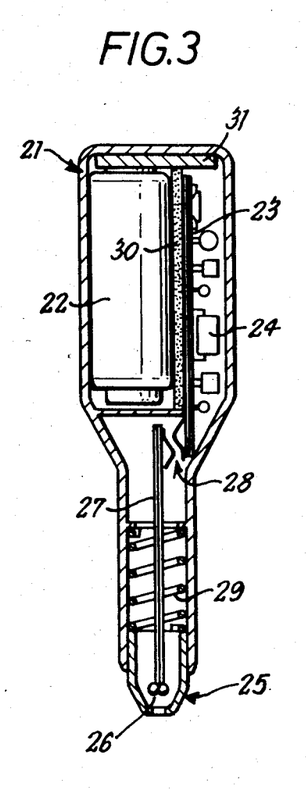
FIG. 3 shows a cross-section through one form of detector "pen"
Figure 4:
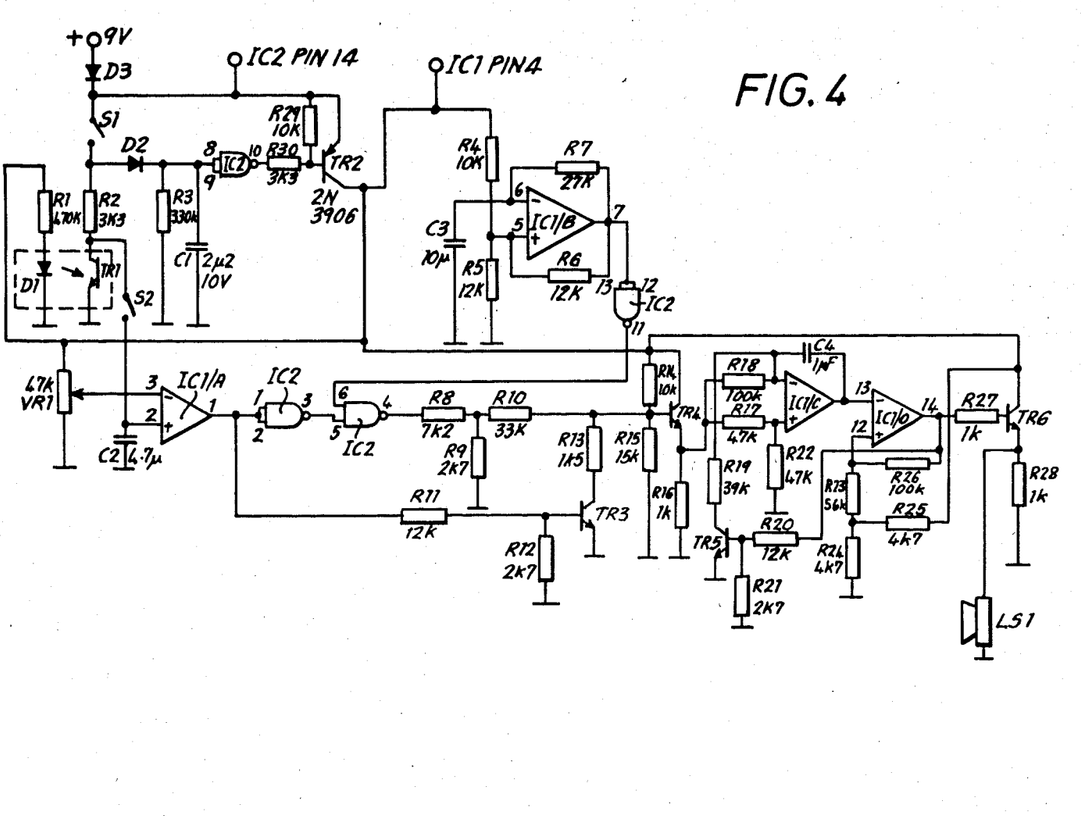
FIG. 4 is the circuit diagram of the detector pen of FIG. 3.

Referring to FIGS. 3 and 4, these show a cross-section through a detector pen and the circuitry thereof. The pen consists of a casing 21 housing a battery 22, a printed circuit board 23 with electronic components 24, and having a spring-loaded tip 25 including an assembly of infrared photo-emitter and photo-detector 26. The infrared elements are mounted on a second printed circuit board 27 which bears half of two pairs of contacts 28 the others being on the printed circuit board 23; they constitute switches S1 and S2 of FIG. 4. Head 25 is biased downwardly as shown in FIG. 3 by a spring 29. Battery 22 is maintained in its compartment secure from rattling by foam pad 30 and the top of the pen includes a piezo-electric audio transducer 31.

Then the pen is placed adjacent paper and pressed down, spring 29 is compressed, contacts 28 make and the circuitry is then activated to produce a perceptible tone from transducer 31. If the signal received by the infrared photo-detector is above a certain level, one sort of tone will be produced, if below it, a different sort.

The circuitry for effecting this is shown in FIG. 4 and operates as follows:

D1 emits infrared radiation, a proportion of which is reflected back from the surface in contact with tip 25. The reflected infrared sets the voltage on the collector of TR1, which in turn causes the output of IC1/A to go either high or low dependant on the setting of VR1. TR1 is combined with D1 in a typical opto electronic package such as described in the AEG-TELEFUNKEN reference noted above. IC1 is an LM324N.

IC1/C and /D form a variable frequency oscillator whose output frequency is dependant on the voltage at the emitter of TR4. (Type 9014).

If IC1/A pin 1 is low, TR3 (also type 9014) is off and oscillator IC1/B switches the oscillator IC1/C and /D between two frequencies. If IC1/A pin 1 is high, TR3 is on; the oscillator IC1/B is inhibited by the action of the NAND gates (IC2 is CMOS 4011B) and the oscillator IC1/C and /D is controlled by the value of R13. The emitted signal is provided by a ceramic transducer LS1 via the circuitry shown. TR5 and TR6 are both type 9014.

When the pen is lifted from the surface, S2 breaks and C2 holds the voltage on the detector collector at IC1 pin 2. S1 then opens and R3/C1 holds on the supply to the unit for 1-2 seconds. Since TR1 is disconnected the unit thus holds the same state that existed when the tip 25 just breaks contact with the surface.

Figure 5:
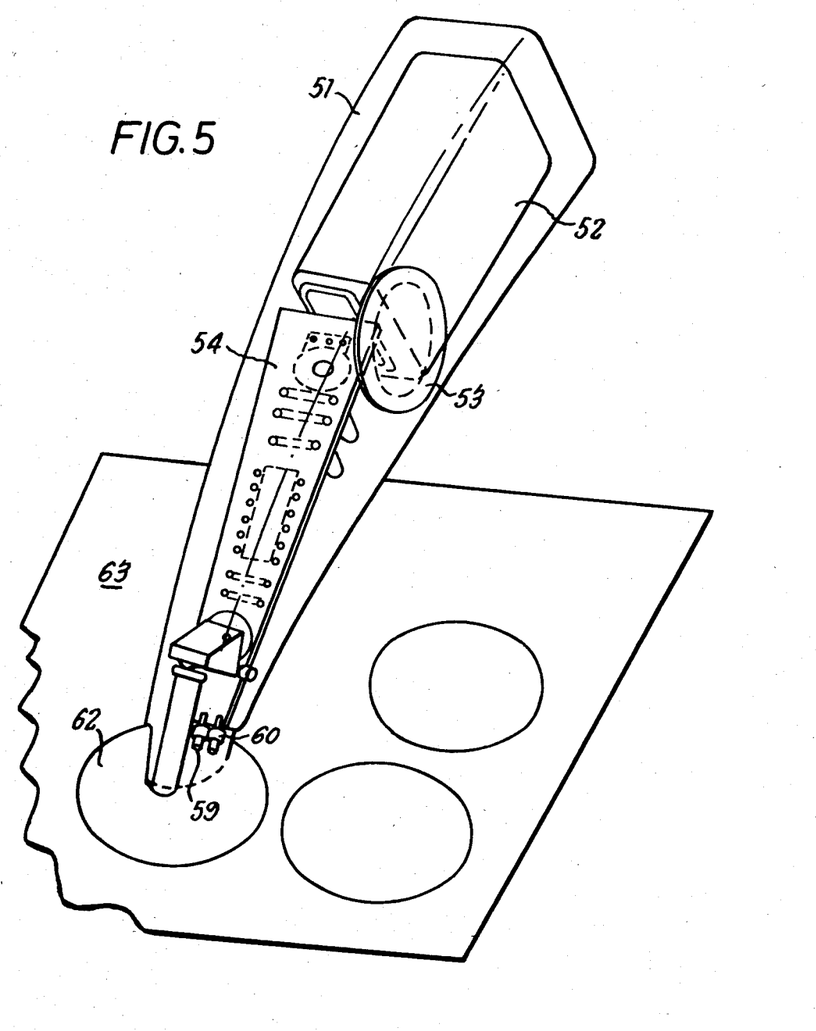
FIG. 5 is a perspective ghost view of an alternative detector.
Figure 6A:
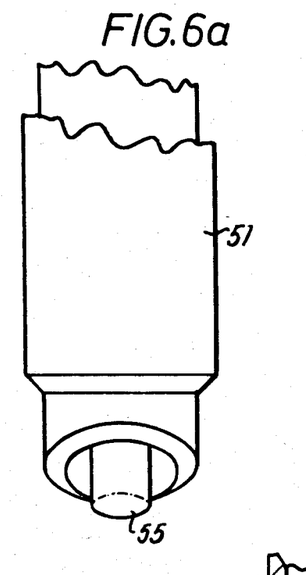
FIGS. 6a, b and c are side, end and sectional views of the tip of the detector of FIG. 5.
Figure 6B:
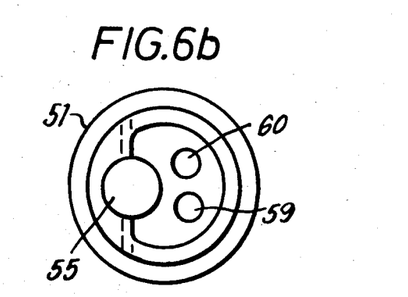
Figure 6C:
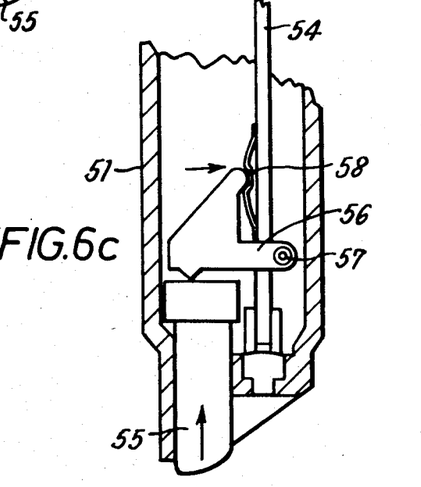

FIGS. 5 and 6 show an alternative and preferred detector pen construction. Referring to FIG. 5, the pen consists of an outer casing 51 having mounted therein a battery 52, a piezo-electric transducer 53 and a printed circuit board 54. Slideably mounted in one end of the casing is an actuation pin 55 which protrudes just past the tip of casing 51. The tip of the casing is so shaped that the pen can be held at an angle as shown in FIG. 5 or FIG. 1. When so held, the actuation pin 55 moves slightly inwardly to lie flush with the end of the casing which then rests against the paper substrate or the like and this inward movement rotates a plastics block 56 which is pivotally mounted on the printed circuit board 54 at 57 and which actuates a spring diaphragm switch 58 on printed circuit board 54. This operates to energise the circuitry on the printed circuit board which in particular energises a combined emitter detector package which is mounted on the lower end of printed circuit board 54 which consists of a gallium arsenide infrared emitting diode 59 and a silicon phototransistor 60, commercially available under designations CQY36N and BPW16N respectively from AEG-TELEFUNKEN.

Depending on the infrared reflectance of the patch of material 62 on a substrate 63 onto which the pen is pressed, the circuitry on printed circuit board 54 causes an appropriate sound to issue from piezo-electric transducer 53.

Figure 7:
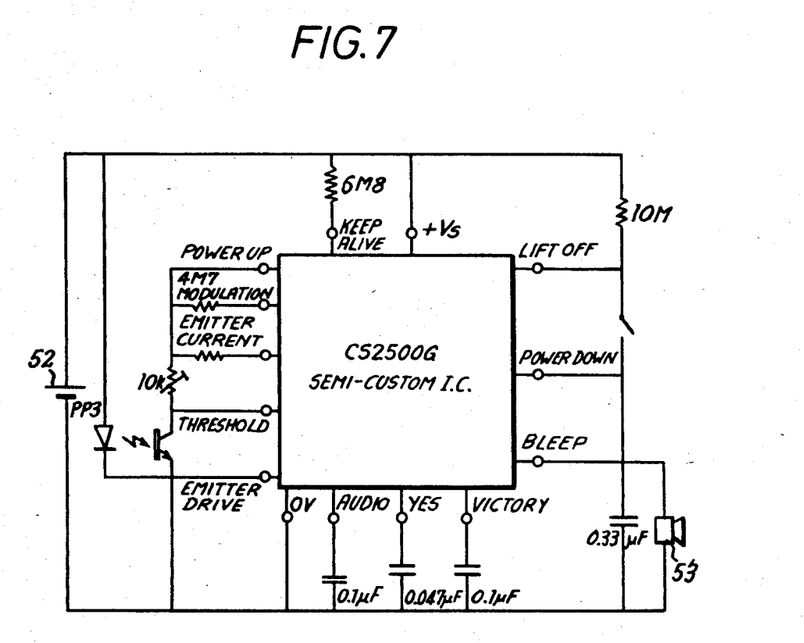
FIG. 7 is a schematic circuit diagram of the detector of FIG. 5.
Figure 8:
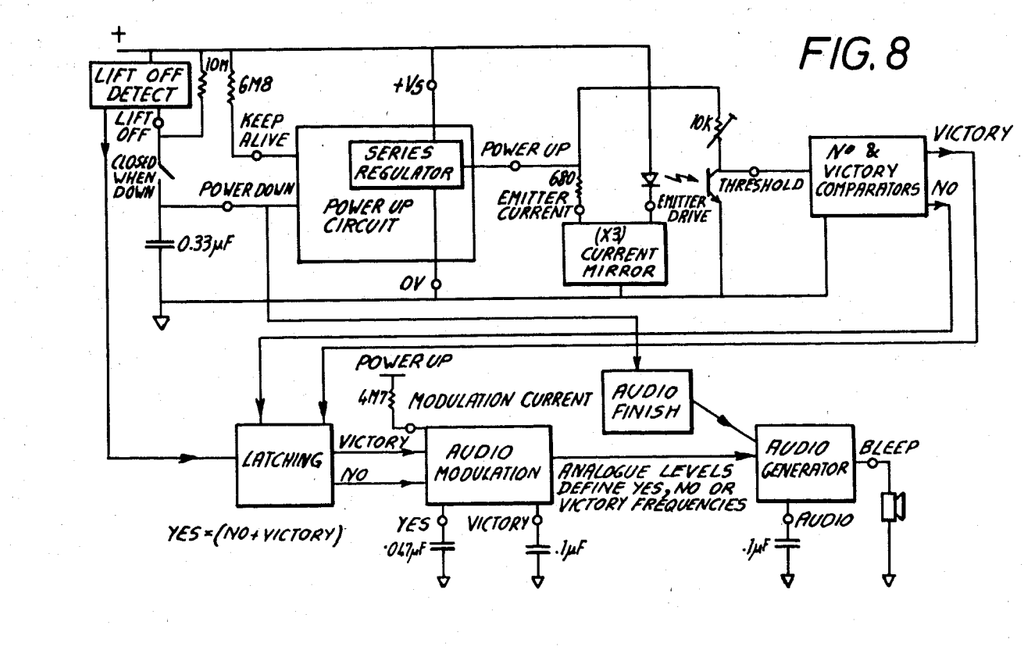
FIG. 8 is a block diagram for the main integrated circuit of the detector of FIG. 7, and FIGS. 9A and 9B provide a complete circuit diagram showing the circuit of the integrated circuit of FIG. 8.
Figure 9A:
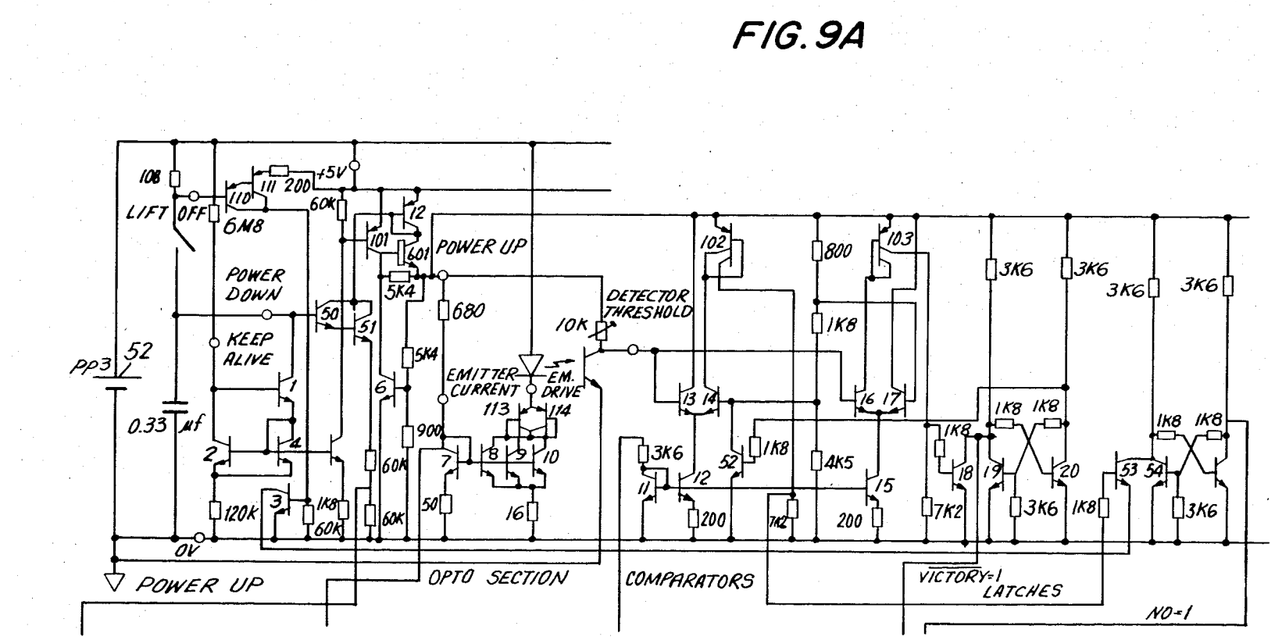
Figure 9B:
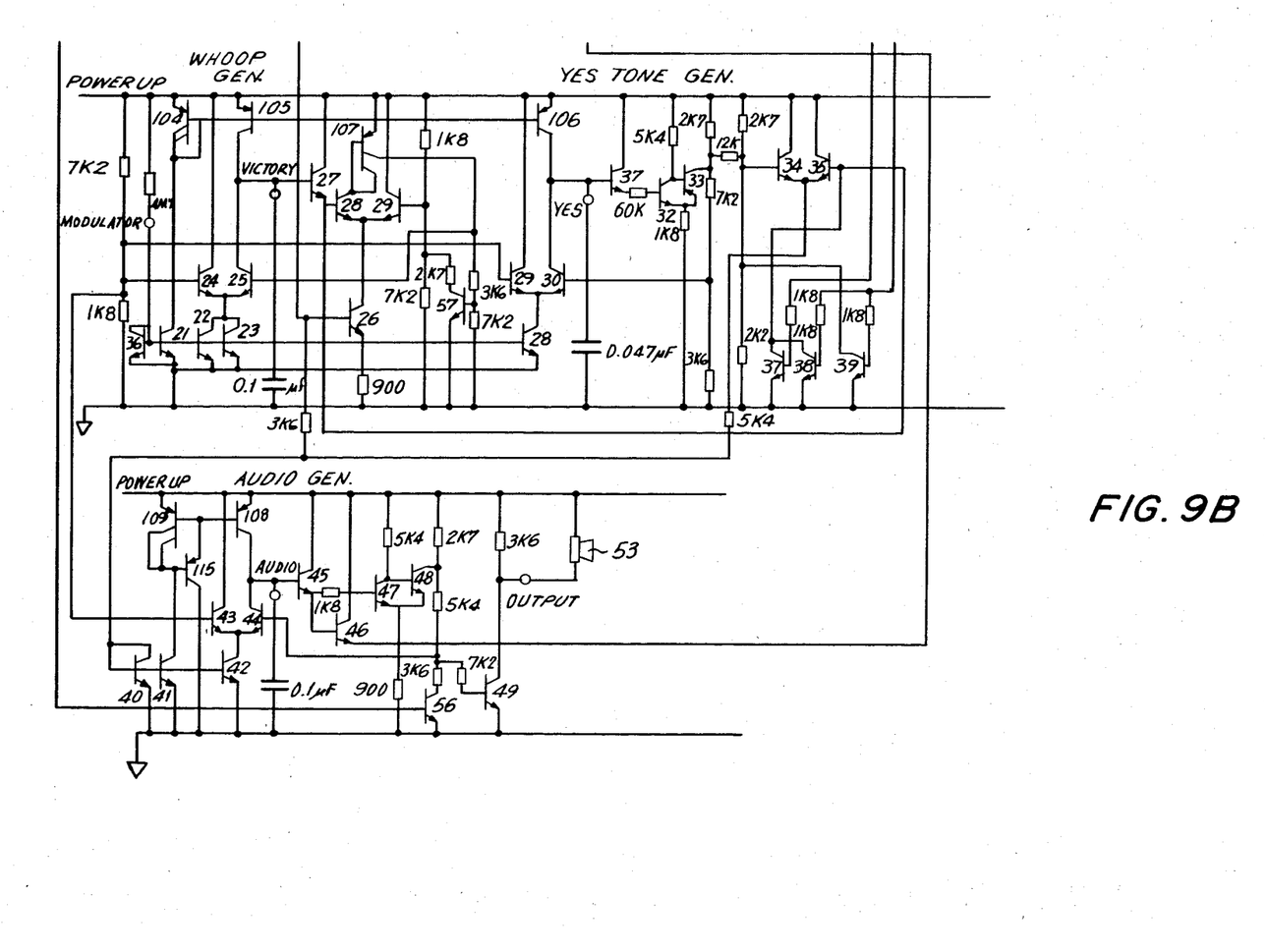

Referring now to the circuit diagrams of FIGS. 7, 8 and 9, these show the preferred circuitry for the pen shown in FIG. 5.

The circuitry is designed to discriminate between three infrared absorption ranges, conveniently denoted low, medium and high and produce three corresponding audible indications. In the particular embodiment described, when patch 62 is printed by four-colour lithographic process printing, using conventional inks, low reflectance generally corresponds to a carbon black ink proportion of less than 15% in the printed patch, medium reflection to carbon black proportions between 15 and 70% and high absorption to carbon black ink proportions of greater than 70%. These are correlated in the embodiment shown with a negative indication, a low buzz of frequency about 70 Hz, a positive indication consisting of a 600 Hz tone modulated at about 5 Hz and a victory or success indication consisting of a whoop like sound. The pen is designed to continue to emit sound for about 1 second after it has been lifted from the substrate and it is also required to latch if either a negative or success audible signal is emitted, such latching being only removable by removal of the pen from the substrate.

FIGS. 7 and 8 show in block diagram form the basic component circuitry. As is evident from FIG. 7, the majority of the components are produced on a semi custom integrated circuit type CS2500G. This is mounted on printed circuit board 54 together with the four external capacitors and four external resistors indicated in FIG. 7 and the combined package of infrared emitting diode and silicon photo-transistor shown. Of the discrete components, all are fixed value save for the 10K potentiometer which is used to compensate for variation in properties of the photo-transistor.

Referring now particularly to FIGS. 8 and 9, it can be seen that the circuit consists basically of five sections conveniently denoted power up, opto, comparators and latches, audio generation and tone generation as indicated on FIG. 9. FIG. 8 shows the basic circuit building blocks and how they are connected together and FIG. 9 shows the full circuit. The various sections operate as follows:

(a) Power up Section

The power up circuit consists of transistors 1, 2, 4, 5, 101, 401 and 112. Transistors 1, 2 and 4 form a Wilson current mirror which needs the collector of 1 positive enough to avoid saturation, and when off with the 0.33 μF capacitor discharged, the transistors lose their gain factors and the voltage across the emitter resistor (120K) drops to under 100 mV with 2–3 μA battery off current. When the switch is closed, the current mirror transistors pass essentially 1 μA through 2 and 4 into the 120K, whose voltage jumps to above 200 mV, causing current amplification of about 40 into 5 with a drop across the 1K8 emitter resistor of some 70 mV. The base current into 5 should be low compared to the 1 μA current feed of 4 so as to get repeatable discharge rates for powering down, which takes just over 1 second to discharge the 0.33 μF capacitor.

The current through 5 turns on 101, with some 10 μA required first for the 60K base resistor. This turns on the large transistor 401, with about 80 μA required first to turn on the 5K4 base transistor. Transistor 112 protects against battery reversal. The power on level is kept essentially constant by transistor 6 plus the 5K4/900 potential divider, giving a $V_{be}$ dependent 5 V approximately varying some 20 mV with battery voltage variation from 6.5 V to 11 V.

(b) Opto Section

The opto emitter current is set by the external 680 resistor together with a current mirror amplifier, stabilised further by the use of emitter resistors (transistors 7–10). PNPs 113 and 114 protect against battery reversal.

The opto detector transistor feeds the 10K trimpot with current, and the voltage developed thus measures the degree of reflection. The internal reference of 800, 1K8 and 4K5 feed levels of approximately 2 V drop from power up to the no comparator and 0.6 V drop to the victory comparator.

(c) Comparators and latches Section

The no and victory comparators are current fed by a delayed action source to allow settling of the opto level before turning on the comparators, the source being conveniently from the audio section. The no comparator is formed by transistors 12, 13, 14 and 102, and victory by 15, 16, 17 and 103, with yes being the absence of no or victory signals. The comparators are standard types with operating currents of over 100 μA, giving sufficient signal across the 7K2 load on the PNP 2-collector mirror to turn on a transistor base.

Due to the latching requirement both when down and after lift off, latches may only be accessed when down, hence the lift off detect circuit formed by 110, 111 and 3, which is operated by the 1 μA current through Power down. This permits the latches to be accessed via 18 and 53 when the pen is down.

Latches are biassed on power up using the extra 3K6 base resistor to ground. The no latch is formed by transistors 54 and 55, and victory by transistors 19 and 20. As no cuts out yes and victory in the audio section, no feedback is necessary to the comparators to prevent subsequent yes or victory readings. However victory must stop a subsequent no by using transistor 52 to switch down the reference chain.

(d) Audio generation Section

The audio generation section responds to a current feed to produce a square wave to the piezo whose frequency is proportional to the input current.

A triangular waveform with the same up and down periods is developed across the audio capacitor. This is achieved by setting a current 1 in transistor 40 which is reflected through transistors 41, 42, 109, 108 and 115, and switched by transistors 43 and 44. The double collector of transistor 109 and single collector of transistor 108 reflects ½I source current on to the capacitor (115 for Wilson mirror for better current feed). I sink current is switched through transistor 44 from the subsequent Schmitt, giving ½I net sink when on and ½I source when off, hence equal up and down rates of capacitor charge.

Transmitter 45 buffers the capacitor, and feeds a conventional Schmitt formed by transistors 47, 48 and 3 resistors. The potential divider from the Schmitt output then feeds transmitter 44, and the audio output transistor 49. Optimum results are achieved for equal mark space with a 1K8 emitter load on transistor 45.

Transistor 50 is for audio switchoff before power down. Transistors 50 and 51, the two 60Ks and transistor 56 provide audio output when power down is above 4 $V_{be}$, hence as the power down capacitor ramps down after lift off audio comes off before power up, preventing unpleasant switchoff sounds. This leads to a delay of about 0.25 seconds with an audio hold on after lift off of about 1 second, after which the latches may be held to the previous reading to give a false reading if the pen is brought down too soon after the sound disappears. These periods occur as a ratio, and absolute values of both audio delay after lift off and modulation periods e.g. yes, are variable by outside components.

(e) Tone generation Section

Tone generation is achieved by setting voltage levels across resistors feeding the audio generator current mirror transistor 40.

The no background of 70 Hz continuous is obtained when yes and victory levels are switched out, and is provided from a $V_{be}$ voltage difference due to differing currents in transistors 7 and 40, across 3K6, with some additional 300 mV across the emitter resistor of transistor 7. This current flows continuously with power on.

The yes and victory levels are provided on the bases of transistors 34 and 35, fed via 5K4 to transistor 40. As victory is higher than yes, it is switched off during yes, so that victory is required from the victory latch.

Taking the yes tone generation first, a modulation current independent of battery volts is set into transistor 36, which requires an external 4m7 resistor due to the low capacitances and hence currents used. With I into transistor 36, the yes capacitor is alternately fed with ½I source and net sink currents, using current feeds 21, 104 (2 collector), 106 (1 collector), and 28 switched via 30, identical to the audio but with lower current. The Schmitt formed by transistors 32 and 33 is again the same circuit configuration as audio but with slightly changed resistors, particularly the additional network of 12K, 2K7 and 2K2 to generate levels on the base of transistor 34 to give a minor third modulation.

The victory whoop section uses similar circuitry, but the net currents across the victory capacitor are ½I source and 1½I sink due to 21 generated by transistors 22 and 23. The schmitt range of hysteresis is increased by different circuit of comparator and switched reference (transistors 26–29, 107 and 57). The victory capacitor is buffered by transistor 27 and fed on to the base of transistor 35, and held low via transistor 37 for yes. When the victory latch switches over, there is a delay while the capacitor charges before the victory whoop occurs.

The pen just described is able to discriminate between three different reflectance ranges but the invention is by no means limited to such simple discrimination or to only three ranges. Circuitry may easily be designed, albeit of a more sophisticated nature, which discriminates between four or more different reflectance ranges, or which gives differing responses in response to a particular sequence of inputs. For example a success or victory response may only be generated following a certain sequence of reflectance values such as low, medium, high, medium, high, medium, low, high. This can be used for sophisticated maze or memory games.

In the embodiments described with respect to the drawings, the detector pen has only one type of output i.e. an audible output. However if desired the pen may have more than one type of output for example an audible output and a flashing light. In addition both circuits described use infrared reflectance to discriminate between the areas on the substrate but analogous circuits may be made which are arranged to detect other differences, for example differences in capacitance or magnetic reluctance. As a further alternative, instead of automatic switching on and off by means of a movable head or actuating pin, the detector pen may have a manually operated on/off switch.

We claim:

1. Apparatus for use in amusement, manual coordination, teaching, educational evaluation and related purposes, said apparatus comprising a substrate for use in conjunction with a manually manipulatable infra-red emitting and infra-red reflectance measuring device; said substrate comprising:
   a sheet of material having determined transparency and reflectivity to infra-red illumination and having opposed major planar surfaces;
   printed matter in any desired organization applied to at least one of said major planar surfaces of said substrate in printings of infra-red transparent inks in selected screen densities to provide coloring on said surface of desired color, hue and intensity;
   selected portions of said printed matter including at least one printing of infra-red transparent ink and an additional printing in a carbon black infra-red absorptive ink in a sufficiently small screen of dots to minimize visually observed discoloration and graying of said infra-red transparent ink, and to minimize visual detection of the presence of said carbon black ink dots, but, sufficient to cause a detectable drop in infra-red reflectance at said selected portions when said selected portions are illuminated with infra-red light; and,
   other portions of said printed matter including screens of said printing of blue, red, and yellow infra-red transparent inks in blue, red and yellow ink combinations simulating the visually observed discoloration and graying of said selected portions caused by the presence of said carbon black ink dots in said selected portions, and, to simulate dots of infra-red transparent non-carbon black ink substantially matching said dots of infra-red absorptive carbon black ink in visually observed discoloration and light absorptance characteristics, whereby;
   casual visual inspection of said substrate will fail to reveal differences in the composition of the inks used in the printing of the respective selected portions and said other portions, but, scanning of said printed substrate with said infra-red emitting and reflectance measuring device will enable differentiation by said device between said selected portions and said other portions.

2. Apparatus according to claim 1, in which said infra-red absorptive carbon black ink is printed in a screen of dots occupying up to 20% per unit area.

3. Apparatus according to claim 1, including further portions of said substrate printed in screen of dots of more than 70% per unit area carbon black ink and having substantially total absorptance to infra-red illumination.

4. Apparatus according to claim 1, in which said selected portions comprise first selected portions, second selected portions and third selected portions, said first selected portions comprising an up to 15% per unit area screen of carbon black ink dots, said second selected portions comprising a screen of 15–70% per unit area carbon black ink dots, and said third selected portions comprising a screen in excess of 70% per unit area carbon black ink dots per units area.

5. Apparatus according to claim 1, in which said printed matter is comprised of a series of overprintings, including a series of overprintings in combinations of blue, red and yellow infra-red transparent inks and one printing in carbon black ink in said selected portions, and a series of overprintings in combinations of blue, red and yellow infra-red transparent inks in said other portions comprised exclusively of non-carbon black inks.

6. Apparatus for use in amusement, manual coordination, teaching, educational evaluation and related purposes, said appratus comprising a substrate for use in conjunction with a manually manipulatable infra-red emitting and infra-red reflectance measuring device; said substrate comprising:
   a sheet of material having determined transparency and reflectivity to infra-red illumination and having opposed major planar surfaces;
   printed matter in any desired organization applied to at least one of said major planar surfaces of said substrate in printings of infra-red transparent inks in selected screen densities to provide coloring on said surface of desired color, hue and intensity;

selected portions of said printed matter including at least one printing of infra-red transparent ink and an additional printing in a carbon black infra-red absorptive ink, and comprising first selected portions, second selected portions and third selected portions;

said first selected portions comprising up to 15% screen of carbon black ink dots per unit area;

said second selected portions comprising a screen of 15–70% of carbon black ink dots per unit area; and, said third selected portions comprising a screen in excess of 70% carbon black ink dots per unit area;

at least said second and third selected portions having an absorbancy to infra-red sufficient to cause a detectable drop in infra-red reflectance at said second and third selected portions when each of said selected portions are illuminated with infra-red light;

other portions of said printed matter including screens of said printing of blue, red and yellow infra-red transparent inks in blue, red and yellow ink combinations simulating the visually observed discoloration and graying of said selected portions caused by the presence of said carbon black ink dots in said selected portions, and, to simulate dots of infra-red transparent non-carbon black ink substantially matching said dots of infra-red absorptive carbon black ink in visually observed discoloration and light absorptance characteristics, whereby;

casual visual inspection of said substrate will fail to reveal differences in the composition of the inks used in the printing of the respective first and second selected portions, but, scanning of said printed substrate with said infra-red emitting and reflectance measuring device will enable differentiation by said device between said first, second and third said selected portions and said other portions.

7. Apparatus according to claim 6, in which said second selected portions comprise a screen of 20–70% carbon black ink dots per unit area.

8. Apparatus according to claim 6, in which said third selected portions are printed in a screen of carbon black ink dots having substantially total absorptance to infra-red illumination.

9. Apparatus according to claim 6, in which said printed matter is comprised of a series of overprintings in combinations of blue, red and yellow infra-red transparent inks and one printing in carbon black ink in said selected portions, and at least three separate overprintings in said other portions comprised exclusively of combinations of blue, red and yellow non-carbon black infra-red transparent inks.

10. Apparatus for use in amusement, manual coordination, teaching, educational evaluation and related purposes, said apparatus comprising in combination, a substrate, and an infra-red emitting and infra-red reflectance measuring device; said substrate comprising:

a sheet of material having determined transparency and reflectivity to infra-red illumination and having opposed major planar surfaces;

printed matter in any desired organization applied to at least one of said major planar surfaces of said substrate in printings of infra-red transparent inks in selected screen densities to provide coloring on said surface of desired color, hue and intensity;

selected portions of said printed matter including at least one printing of infra-red transparent ink and an additional printing in a carbon black infra-red absorptive ink in a sufficiently small screen of dots to minimize visually observed discoloration and graying of said infra-red transparent ink and minimize visual detection of the presence of said carbon black ink dots, but, sufficient to cause a detectable drop in infra-red reflectance at said selected portions when said selected portions are illuminated with infra-red light; and, other portions of said printed matter including screens of said printing of blue, red, and yellow infra-red transparent inks in blue, red and yellow ink combinations simulating the visually observed discoloration and graying of said selected portions caused by the presence of said carbon black ink dots in said selected portions, and, to simulate dots of infra-red transparent non-carbon black ink substantially matching said dots of infra-red absorptive carbon black ink in visually observed discoloration and light absorptance characteristics, whereby;

casual visual inspection of said substrate will fail to reveal differences in the composition of the inks used in the printing of the respective selected portions and said other portions, but, scanning of said printed substrate with said infra-red emitting and reflectance measuring device will enable differentiation by said device between said selected portions and said other portions;

said infra-red emitting and infra-red reflectance measuring device including:

a hand-holdable and manipulatable body;

a source of infra-red emission incorporated into said body;

means for activating said source of infra-red emission when said device is brought into proximity with said substrate;

means for directing said infra-red emission onto a selected portion of said substrate and the matter printed thereon when said means for directing said infra-red emission is brought into proximity with said substrate and said source of infra-red emission is activated; and means for collecting and measuring the intensity of infra-red radiation reflected from said substrate.

11. The apparatus of claim 10, in which said infra-red emitting and infra-red reflectance measuring device provides differentiation between levels of infra-red reflection received by said device, and said device includes:

means for emitting a negative indication when over 80% of the emitted infra-red emission is reflected by said substrate and received by said device;

means for emitting a positive indication when between 20% and 80% of the emitted infra-red emission is reflected by said substrate and received by said device; and means for emitting a victory signal when less than 20% of said emitted infra-red emission is reflected by said substrate and received by said device.

12. Apparatus according to claim 10, including further portions of said substrate printed in screen of more than 70% carbon black ink dots and having substantially total absorptance to infra-red illumination.

13. Apparatus according to claim 10, in which said infra-red absorptive carbon black ink is printed in a screen of dots occupying up to 20% per unit area.

14. Apparatus according to claim 10, in which said selected portions comprise first selected portions, second selected portions and third selected portions, said first selected portions comprising an up to 20% screen of carbon black ink dots per unit area, said second selected portions comprising a screen of 15–70% carbon black ink dots per unit area, and said third selected portions comprising a screen in excess of 70% carbon black ink dots per unit area.

15. Apparatus according to claim 10, in which said printed matter is comprised of a series of overprintings in combinations of blue, red and yellow and infra-red transparent inks and one printing in carbon black ink in said selected portions, and at least three separate overprintings in combinations of blue, red and yellow infrared transparent inks in said other portions comprised exclusively of non-carbon black inks.

16. Apparatus for use in amusement, manual coordination, teaching, educational evaluation and related purposes, said apparatus comprising, in combination, a substrate and a manually manipulatable infra-red emitting and infra-red reflectance measuring device; said substrate comprising:
   a sheet of material having determined transparency and reflectivity to infra-red illumination and having opposed major planar surfaces;
   printed matter in any desired organization applied to at least one of said major planar surfaces of said substrate in printings of infra-red transparent inks in selected screen densities to provide coloring on said surface of desired color, hue and intensity;
   selected portions of said printed matter including at least one printing of infra-red transparent ink and an additional printing in a carbon black infra-red absorptive ink, and comprising first selected portions, second selected portions and third selected portions;
   said first selected portions comprising up to 15% screen of carbon black ink dots per unit area;
   said second selected portions comprising a screen of 15–70% of carbon black ink dots per unit area; and,
   said third selected portions comprising a screen in excess of 70% carbon black ink dots per unit area;
   at least said second and third selected portions having an absorbancy to infra-red sufficient to cause a detectable drop in infra-red reflectance at said second and third selected portions when each of said selected portions are illuminated with infra-red light;
   other portions of said printed matter including screens of said printing of blue, red and yellow infra-red transparent inks in blue, red and yellow ink combinations simulating the visually observed discoloration and graying of said selected portions caused by the presence of said carbon black ink dots in said selected portions, and, to simulate dots of infra-red transparent non-carbon black ink substantially matching said dots of infra-red absorptive carbon black ink in visually observed discoloration and light absorptance characteristics, whereby;
   casual visual inspection of said substrate will fail to reveal differences in the composition of the inks used in the printing of the respective first and second selected portions, but, scanning of said printed substrate with said infra-red emitting and reflectance measuring device will enable differentiation by said device between said first, second and third said selected portions and said other portions;
said infra-red emitting and infra-red reflectance measuring device including:
   a hand-holdable and manipulatable body;
   a source of infra-red emission incorporated into said body;
   means for activating said source of infra-red emission when said device is brought into proximity with said substrate;
   means for directing said infra-red emission onto a selected portion of said substrate and the matter printed thereon when said means for directing said infra-red emission is brought into proximity with said substrate and said source of infra-red emission is activated; and
   means for collecting and measuring the intensity of infra-red radiation reflected from said substrate.

17. Apparatus according to claim 16, in which said second portions comprises a screen of 20–70% carbon black ink dots per unit area.

18. Apparatus according to claim 16, in which said third selected portions are printed in a screen of carbon black ink dots having substantially total absorptance to infra-red illumination.

19. Apparatus according to claim 16, in which said printed matter is comprised of overprintings in combinations of blue, red and yellow infra red transparent inks and one printing in carbon black ink in said selected portions, and at least three separate overprintings in combinations of blue, red and yellow infra-red transparent inks in said other portions comprised exclusively of non-carbon black inks.

20. Apparatus for use in amusement, manual coordination, teaching, educational evaluation and related purposes, said apparatus comprising a substrate for use in conjunction with a manually manipulatable infra-red emitting and infra-red reflectance measuring device: said substrate comprising:
   a sheet of material having determined transparency and reflectivity to infra-red illumination and having opposed major planar surfaces;
   printed matter of any desired hue, color, intensity and organization applied to said substrate in first determined areas, and printed matter of any desired hue, color, intensity and organization applied to said substrate in second determined areas separate from said first determined areas, said respective printings of printed matter including:
   at least one printing within the extent of said first determined areas comprised of infra-red transparent ink having insufficient carbon black content to cause detection of absorption of infra-red light when said first determined areas are illuminated with infra-red light by said scanner and scanned by said scanner;
   at least one printing within the extent of said second determined areas comprised of infra-red transparent ink together with carbon black in a sufficient minor quantity to cause detection of absorption of infra-red light above a determined threshold when said second determined areas are illuminated with infra-red light by said scanner and scanned by said scanner;
   the carbon black included in said at least one printing of said second determined areas being dispersed substantially uniformly throughout the entire extent of said areas, and being present in insufficient quantity to enable visual detection of the presence of said carbon black;
   the color, hue and intensity of the infra-red transparent ink included in said at least one printing of said second determined areas being selected to intentionally visually obscure and obfuscate the presence of carbon black within the printing of said second determined areas.

21. The apparatus of claim 20, in which said printings in said first and second areas include a series of overprintings in combinations of blue, red and yellow infra-red transparent non-carbon black inks.

22. The apparatus of claim 20, in which said printed matter in said second determined areas comprises at least one printing in infra-red transparent ink, and at least one printing in a screen of carbon black ink dots.

23. The apparatus of claim 22, in which said printings of said second first determined areas include a series of overprintings in combinations of blue, red and yellow infra-red transparent non-carbon black inks simulating the visually observed greying and discoloration of said second determined areas resulting from said carbon black ink dots concealed within said printings of said second areas.

24. The apparatus of claim 20 in which said carbon black in said second determined areas is present in a 20% screen of dots per unit area.

25. The apparatus of claim 20, in which said carbon black in said second determined areas is present in first, second and third portions of said second determined areas respectively in screens of dots of up to 20%, 20-70%, and above 70% per unit area.

26. The apparatus of claim 20, in combination with an infra-red emitting and infra-red reflectance measuring scanning device including:
a hand-holdable and manipulatable body;
a source of infra-red emission incorporated into said body;
means for activating said source of infra-red emission when said device is brought into proximity with said substrate;
means for directing said infra-red emission onto a selected portion of said substrate and the matter printed thereon when said means for directing said infra-red emission is brought into proximity with said substrate and said source of infra-red emission is activated; and
means for collecting and measuring the intensity of infra-red radiation reflected from said substrate.

* * * * *